United States Patent
Amizic et al.

(10) Patent No.: US 7,382,828 B2
(45) Date of Patent: Jun. 3, 2008

(54) CHANNEL IMPULSE RESPONSE (CIR) ESTIMATING DECISION FEEDBACK EQUALIZER WITH PHASE TRACKER

(75) Inventors: Bruno Amizic, Chicago, IL (US); Mark Fimoff, Hoffman Estates, IL (US); Sreenivasa M. Nerayanuru, Wheeling, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 477 days.

(21) Appl. No.: 11/114,573

(22) Filed: Apr. 26, 2005

(65) Prior Publication Data

US 2006/0239342 A1 Oct. 26, 2006

(51) Int. Cl.
*H03H 7/30* (2006.01)
(52) U.S. Cl. .................. 375/233; 375/341; 375/265
(58) Field of Classification Search ............... 375/233, 375/341, 265
See application file for complete search history.

(56) References Cited

U.S. PATENT DOCUMENTS

| | | | |
|---|---|---|---|
| 5,406,587 A | 4/1995 | Horwitz et al. | |
| 6,823,489 B2 * | 11/2004 | Wittig et al. | 714/792 |
| 7,006,566 B2 * | 2/2006 | Birru | 375/233 |
| 7,218,672 B2 * | 5/2007 | Birru | 375/233 |
| 2002/0154248 A1 | 10/2002 | Wittig et al. | |
| 2002/0186762 A1 * | 12/2002 | Xia et al. | 375/232 |
| 2005/0129107 A1 * | 6/2005 | Park et al. | 375/233 |
| 2005/0175081 A1 * | 8/2005 | Zhidkov | 375/232 |
| 2005/0254568 A1 * | 11/2005 | Markman et al. | 375/233 |

* cited by examiner

*Primary Examiner*—Mohammed Ghayour
*Assistant Examiner*—Juan A. Torres

(57) ABSTRACT

An equalizer system includes an equalizer, first and second decoders, and a tap weight controller. The equalizer equalizes a received signal to provide an equalizer output. The first decoder is characterized by a first parallel output, and the first decoder decodes the equalizer output to provide first symbol decisions having a first accuracy. The second decoder is characterized by a second parallel output, the second decoder receives the first parallel output and decodes the equalizer output to provide second symbol decisions having a second accuracy, the first accuracy is greater than the second accuracy, and the second decoder applies the second parallel output to the equalizer. The tap weight controller determines tap weights based on the first symbol decisions and supplies the tap weights to the equalizer.

21 Claims, 5 Drawing Sheets

| Segment Sync | PN511 | PN63 | PN63 | PN63 | Mode, Reserved & Precode Symbols |
|---|---|---|---|---|---|

CHANNEL IMPULSE RESPONSE (CIR) ESTIMATING DECISION FEEDBACK EQUALIZER WITH PHASE TRACKER

RELATED APPLICATION

This application relates to the subject matter disclosed in U.S. application Ser. No. 10/911,282 filed on Aug. 1, 2004.

TECHNICAL FIELD OF THE INVENTION

The present invention relates to the estimation of channel impulse responses for equalizers such as decision feedback equalizers.

BACKGROUND OF THE INVENTION

Since the adoption of the Advanced Television Systems Committee (ATSC) digital television (DTV) standard in 1996, there has been an ongoing effort to improve the design of receivers built for the ATSC DTV signal. The primary obstacle that faces designers in designing receivers so that they achieve good reception is the presence of multipath interference in the broadcast television channel.

The broadcast television channel is a relatively severe multipath environment due to a variety of conditions that are encountered in the channel and at the receiver. Strong interfering signals may arrive at the receiver both before and after the largest amplitude signal. In addition, the signal transmitted through the channel is subject to time varying channel conditions due to the movement of the transmitter and signal reflectors, airplane flutter, and, for indoor reception, people walking around the room. If mobile reception is desired, movement of the receiver must also be considered. Designers add equalizers to receivers in order to cancel the effects of multipath interference and thereby improve signal reception.

Because the channel is not known a priori at the receiver, the equalizer must be able to adapt its response to the channel conditions that it encounters and to changes in those channel conditions. To aid in the convergence of an adaptive equalizer to the channel conditions, the field sync segment of the frame as defined in the ATSC standard may be used as a training sequence for the equalizer.

The frame as defined in the ATSC standard is shown in FIG. 1. Each frame contains two data fields, each data field contains 313 segments, and each segment contains 832 symbols. The first four of these symbols in each segment are segment sync symbols having the predefined symbol sequence [+5, −5, −5, +5].

The first segment in each field is a field sync segment. As shown in FIG. 2, the field sync segment comprises the four segment sync symbols discussed above followed by a pseudo-noise sequence having a length of 511 symbols (PN511) followed in turn by three pseudo-noise sequences each having a length of 63 symbols (PN63). Like the segment sync symbols, all four of the pseudo-noise sequences are composed of symbols from the predefined symbol set {+5, −5}. In alternate fields, the three PN63 sequences are identical; in the remaining fields, the center PN63 sequence is inverted. The pseudo-noise sequences are followed by 128 symbols, which are composed of various mode, reserved, and precode symbols. The next 312 segments of the field are each comprised of the four segment sync symbols followed by 828 8 level symbols that have been encoded with a 12 phase trellis coder.

Because the first 704 symbols of each field sync segment are known, these symbols, as discussed above, may be used as a training sequence for an adaptive equalizer. The original Grand Alliance receiver used an adaptive decision feedback equalizer (DFE) with 256 taps. The adaptive decision feedback equalizer was adapted to the channel using a standard least mean square (LMS) algorithm, and was trained with the field sync segment of the transmitted frame.

However, because the field sync segment is transmitted relatively infrequently (about every 260,000 symbols), the total convergence time of this equalizer is quite long if the equalizer adapts only on training symbols prior to convergence. Therefore, it is known to use the symbol decisions made by the receiver in order to adapt equalizers to follow channel variations that occur between training sequences.

An adaptive decision feedback equalizer in an 8 VSB receiver would be expected to use an 8 level slicer to make the symbol decisions that would be used to adapt the equalizer to the channel between transmissions of the training sequence. However, use of a symbol slicer results in many symbol decision errors being fed to the feedback filter of the decision feedback equalizer when the channel has significant multipath distortion or a low signal to noise ratio. These errors give rise to further errors resulting in what is called error propagation within the decision feedback equalizer. Error propagation greatly degrades the performance of the decision feedback equalizer.

The present invention instead relies on decoders to avoid the convergence and tracking problems of previous decision feedback equalizers.

SUMMARY OF THE INVENTION

In accordance with one aspect of the present invention, a method of operating a decision feedback equalizer comprises the following: correcting an output of the decision feedback equalizer to produce a corrected output characterized by a delay d; making first symbol decisions based on the corrected output, wherein the first symbol decisions are made by a first long traceback decoder having a parallel path memory output; storing an amount of the output of the decision feedback equalizer commensurate with the delay d, wherein the stored output comprises the most recent output of the decision feedback equalizer; making second symbol decisions based on the stored output and the parallel path memory output from the first long traceback decoder, wherein the second symbol decisions are made by a second long traceback decoder having a parallel path memory output; applying the parallel path memory output of the second long traceback decoder to the decision feedback equalizer; and, determining tap weights for the decision feedback equalizer based on the symbol decisions made by the first long traceback decoder.

In accordance with another aspect of the present invention, an equalizer system comprises a feed forward filter, a feedback filter, a combiner, a signal corrector, first and second decoders, a memory, and a tap weight controller. The feed forward filter receives data to be equalized. The combiner combines outputs from the feed forward filter and the feedback filter to provide an equalizer output. The signal corrector corrects the equalizer output to provide a corrected output characterized by a delay d. The first decoder is characterized by a first parallel output, and the first decoder decodes the corrected output to provide a first decoded output. The memory stores an amount of the equalizer output commensurate with the delay d, and the stored equalizer output comprises the most recent equalizer output.

The second decoder is characterized by a second parallel output, the second decoder receives the first parallel output and the stored equalizer output and decodes the stored equalizer output to provide a second parallel output, and the second decoder applies the second parallel output to the feedback filter. The tap weight controller determines tap weights based on the first decoded output and supplies the tap weights to the feed forward filter and to the feedback filter.

In accordance with still another aspect of the present invention, an equalizer system comprises an equalizer, a signal corrector, first and second decoders, a memory, and a tap weight controller. The equalizer is arranged to provide an equalizer output. The signal corrector corrects the equalizer output to provide a corrected output characterized by a delay d. The first decoder is characterized by a first parallel output, and the first decoder decodes the corrected output to provide a first decoded output. The memory stores an amount of the equalizer output commensurate with the delay d, and the stored equalizer output comprises the most recent equalizer output. The second decoder is characterized by a second parallel output, the second decoder receives the first parallel output and the stored equalizer output and decodes the stored equalizer output to provide a second parallel output, and the second decoder applies the second parallel output to the equalizer. The tap weight controller determines tap weights based on the first decoded output and supplies the tap weights to the equalizer.

BRIEF DESCRIPTION OF THE DRAWINGS

These and other features and advantages will become more apparent from a detailed consideration of the invention when taken in conjunction with the drawings in which.

DETAILED DESCRIPTION

Figures 1, 2:
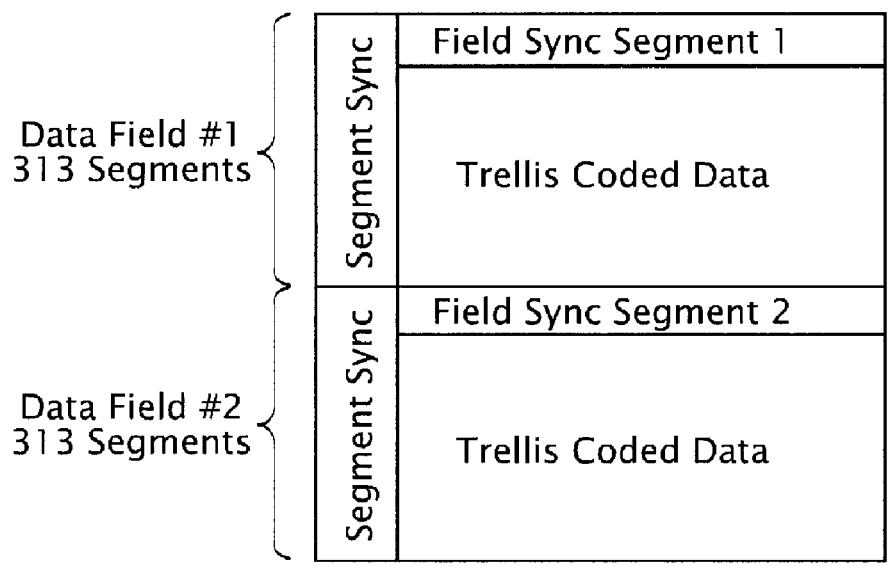
FIG. 1 illustrates a data frame according to the ATSC DTV standard.
FIG. 2 illustrates the field sync segment of the fields comprising the data frame of FIG. 1.
Figure 3:
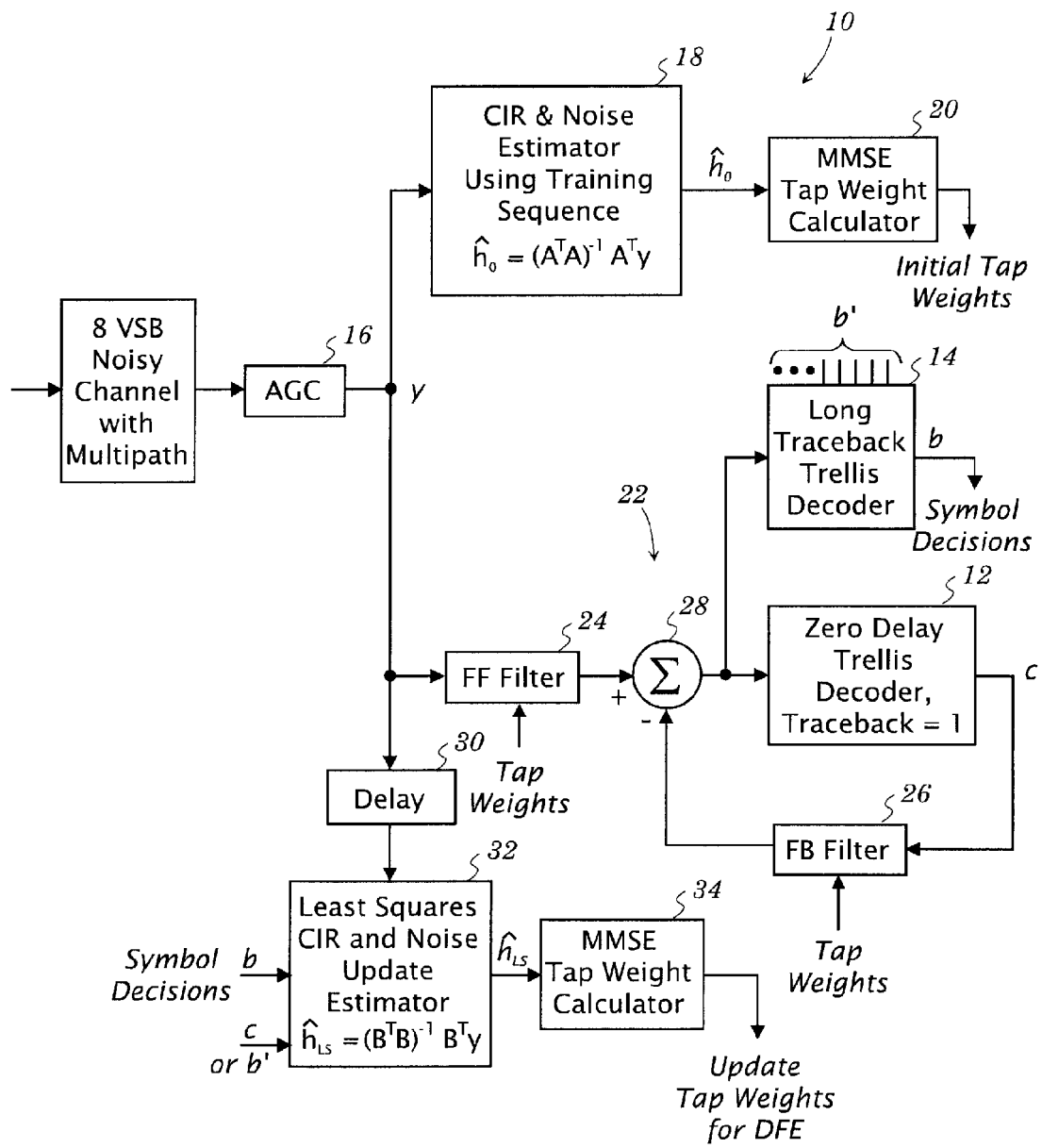
FIG. 3 illustrates a tracking decision feedback equalizer system that avoids problems of prior art equalizer systems.

FIG. 3 illustrates a decision feedback equalizer system 10 that avoids and/or mitigates the convergence and/or tracking problems of previous decision feedback equalizers. The tap weights are calculated based on estimates of the channel impulse response. This arrangement makes use of two decoders, e.g., a short traceback trellis decoder 12 and a long traceback trellis decoder 14. The short traceback trellis decoder 12, for example, may be a zero delay trellis decoder having a traceback depth of one, and the long traceback trellis decoder 14, for example, has a long traceback depth such as a traceback depth of 32. Theses trellis decoders are 12 phase trellis decoders with a delay equal to 12× (traceback depth−1).

The signal from the channel is processed by an automatic gain controller 16, which provides the equalizer input signal y. A channel impulse response and noise estimator 18 uses the transmitted training sequence as received in the equalizer input signal y and a stored version of the transmitted training sequence to provide an estimate $\hat{h}_0$ of the channel impulse response. A tap weight calculator 20 calculates a set of tap weights based on the initial estimate $\hat{h}_0$ of the channel impulse response using, for example, a minimum mean square error (MMSE) based algorithm, and supplies this set of tap weights to a decision feedback equalizer 22 that includes a feed forward filter 24 and a feedback filter 26.

The decision feedback equalizer 22 equalizes the data symbols contained in the equalizer input signal y based on these training sequence derived tap weights and includes a summer 28 which supplies the equalizer output of the decision feedback equalizer 22 to the short traceback trellis decoder 12 and to the long traceback trellis decoder 14.

The decoded output, such as the maximum delay output, of the long traceback trellis decoder 14 forms the symbol decisions b. The feedback filter 26 filters the output of the short traceback trellis decoder 12, and the filtered output of the feedback filter 26 is subtracted by the summer 28 from the output of the feed forward filter 24 to provide the equalizer output.

The equalizer input signal y is delayed by a delay 30, and the delayed equalizer input signal y and the symbol decisions b are processed by a least squares channel impulse and noise update estimator 32 that produces an updated channel impulse estimate $\hat{h}_{LS}$. A tap weight calculator 34 uses the updated channel impulse estimate $\hat{h}_{LS}$ to calculate an updated set of tap weights for the decision feedback equalizer 22. The tap weights determined by the tap weight calculator 34 are provided to the decision feedback equalizer 22 during periods when the tap weights based on the training sequence are not available from the tap weight calculator 20. The delay imposed by the delay 30 is equal to the combined processing delay of the decision feedback equalizer 22 and the long traceback trellis decoder 14.

Because the data symbols in an 8-VSB system are trellis coded, it is desirable to make use of the long traceback trellis decoder 14 as the symbol decision device to supply symbol decisions to the least square channel impulse and noise update estimator 32. By using a trellis decoder instead of a symbol slicer, the number of symbol decision errors supplied to the feedback filter 26 is reduced.

The reliability of a trellis decoder is proportional to its traceback depth. The long traceback trellis decoder 14, because of its longer traceback depth, produces more reliable decisions. However, because of its longer traceback depth, the decision process of the long traceback trellis decoder 14 incurs a longer delay.

By contrast, the symbol decisions of the short traceback trellis decoder 12 are less reliable because of its shorter traceback depth. However, while its symbol decisions are less reliable than a trellis decoder with a longer delay, the short traceback trellis decoder 12 is still significantly more reliable than an 8 level symbol slicer.

It is well known that a symbol decision device with a delay greater than zero creates a problem for a decision feedback equalizer with respect to the cancellation of short delay multipath. Therefore, decision feedback equalizers for 8 VSB receivers with a zero delay trellis decoder in the feedback loop have been used to reduce error propagation. Thus, the decision feedback equalizer 22 uses the short traceback trellis decoder 12 in the feedback loop of the feedback filter 26.

As indicated above, the output of the decision feedback equalizer 22 is the output of the summer 28. This equalizer output is fed to the long traceback trellis decoder 14. The long traceback trellis decoder 14 has a long traceback depth (e.g., traceback depth=32, delay=12×31=372 symbols). The long traceback trellis decoder 14 provides the final bit decisions for the subsequent stages of the receiver in which the decision feedback equalizer 22 is used. Also, as described below, the long traceback trellis decoder 14 provides symbol decisions used by the least squares channel impulse and noise update estimator 32 in order to calculate the updated channel impulse response estimate that is used by the tap weight calculator 34 to calculate the updated tap weights for the decision feedback equalizer 22 so that the decision feedback equalizer 22 can follow variations in the channel impulse response that occur between training sequences.

Thus, the channel impulse response estimate $\hat{h}_0$ is formed by the channel impulse response and noise estimator 18 from the received training sequence, and a set of tap weights are calculated by the tap weight calculator 20 from that channel impulse response estimate. Then, as the decision feedback equalizer 22 runs, reliable symbols decisions are taken from the long traceback trellis decoder 14 as relatively long pseudo training sequences, and these relatively long pseudo training sequences are used by the least squares channel impulse and noise update estimator 32 to calculate the updated channel impulse response estimates $\hat{h}_{LS}$ from which updated decision feedback equalizer tap weights are calculated by the tap weight calculator 34. This process allows for the tracking of time varying channel impulse responses.

As indicated above, the channel impulse response estimate $\hat{h}_0$ is based on the received training sequence. The channel impulse response estimate $\hat{h}_0$ to be estimated is of length $L_h = L_{ha} + L_{hc} + 1$ where $L_{ha}$ is the length of the anti-causal part of the channel impulse response estimate $\hat{h}_0$ and $L_{hc}$ is the length of the causal part of the channel impulse response estimate $\hat{h}_0$. The length of the training sequence is $L_n$.

It may be assumed that the $L_n$ long vector of the a priori known training symbols as transmitted is given by the following expression:

$$a = [a_0, \cdots, a_{L_n-1}]^T \quad (1)$$

The vector of received symbols is given by the following equation:

$$y = [y_{L_{hc}}, \cdots, y_{L_n-L_{ha}-1}]^T \quad (2)$$

The first received training data element is designated $y_0$. Typically, this would mean that $y_0$ contains a contribution from the first transmitted training symbol multiplied by the maximum magnitude tap of the channel impulse response vector h. Note that the vector y contains data elements comprised of contributions due to multipath only of a priori known training symbols. Also, the vector y does not include $y_0$ which may contain contributions of unknown 8 level symbols due to multipath.

A convolution matrix A of size $(L_n - L_{ha} - L_{hc}) \times (L_{ha} + L_{hc} + 1)$ may be formed from the known transmitted training symbols as given by the following equation:

$$A = \begin{bmatrix} a_{L_{ha}+L_{hc}} & a_{L_{ha}+L_{hc}-1} & - & a_0 \\ a_{L_{ha}+L_{hc}+1} & a_{L_{ha}+L_{hc}} & & a_1 \\ - & - & & - \\ a_{L_n-1} & a_{L_n-2} & - & a_{L_n-L_{ha}-L_{hc}-1} \end{bmatrix} \quad (3)$$

Because the vector y of received symbols is given by the following equation:

$$y = Ah + v \quad (4)$$

where h is the channel impulse response vector of length $L_h$ and v is a noise vector, the least squares channel impulse response estimate is given by the solution of equation (4) according to the following equation:

$$\hat{h}_\Theta = (A^T A)^{-1} A^T y \quad (5)$$

However, this method is only effective if $L_n$ satisfies the following inequality:

$$L_n \geq 2(L_{ha} + L_{hc}) - 1 \quad (6)$$

If the training sequence is too short with respect to the length of the channel impulse response, then this method does not produce a good result because the system of equations given by equation (4) to be solved is underdetermined, which is often the case for 8 VSB terrestrial channels. For example, with $L_n = 704$, the channel impulse response must be less than 352 symbols long. However, longer channel impulse responses are commonly found in practice.

A better method for finding the channel impulse response is based on a modified form of the convolution matrix A. A long vector a of length $L_n$ of a priori known training symbols is again given by the expression (1). However, the convolution matrix A this time is an $(L_n + L_{ha} + L_{hc}) \times L_h$ convolution matrix comprising training symbols and zeros and is given by the following equation:

$$A = \begin{bmatrix} a_0 & 0 & - & - & - & 0 \\ - & a_0 & 0 & & & - \\ - & & & & & - \\ - & & & 0 & & 0 \\ a_{L_h-2} & - & - & - & a_0 & 0 \\ a_{L_h-1} & - & - & - & - & a_0 \\ - & & & & & - \\ a_{L_n-1} & - & - & - & & a_{L_n-L_h} \\ 0 & a_{L_n-1} & & & & a_{L_n-L_h-1} \\ - & 0 & & & & \\ - & & & & & \\ - & & & & a_{L_n-1} & a_{L_n-2} \\ 0 & - & - & - & 0 & a_{L_n-1} \end{bmatrix} \quad (7)$$

The vector of received symbols is given by the following equation:

$$y = [y_{-L_{ha}}, \cdots, y_0, \cdots, y_{L_n+L_{hc}-1}]^T \quad (8)$$

where $y_0$ through $Y_{L_n-1}$ are the received training symbols. So, the vector of equation (8) contains the known training symbols as well as contributions from random symbols before and after the training sequence due to multipath.

Again, equation (4) needs to be solved. Now, the convolution matrix A is a taller matrix because zeros have been substituted for the unknown symbols that surround the training sequence. This new convolution matrix A yields an over-determined system of equations.

The initial channel impulse response and noise estimator 18 solves equation (4) according to equation (5) using the new convolution matrix A of equation (7) and vector y of equation (8) to produce the channel impulse response estimate $\hat{h}_0$. More complicated methods may be utilized to give even more accurate results, if necessary.

The tap weight calculator 20 uses the channel impulse response estimate $\hat{h}_0$ to calculate a set of minimum mean square error (MMSE) tap weights for the decision feedback equalizer 22. Methods for calculating minimum mean square error tap weights from a channel impulse response are well known. Alternatively, the tap weight calculator 20 may use other methods such as the zero-forcing method to calculate the tap weights.

Accurate channel impulse response estimate updates can also be calculated between training sequences (when only a priori unknown symbols are received). For example, a least squares channel impulse response estimation may be calculated from an over determined system of equations. Dynamic changes to the channel impulse response may be accurately tracked by using receiver trellis decoder decisions on input symbols to form a long sequence of near perfectly decoded symbols. This sequence should have relatively few errors, even near threshold, and is selected to be long enough so that the underdetermined system problem of the "too short" 8 VSB training sequence is eliminated. The channel impulse response may be, for example, updated as often as once per segment (or more or less often).

The updated channel impulse response to be estimated is, as before, of length $L_h = L_{ha} + L_{hc} + 1$ where $L_{ha}$ is the length of the anti-causal part of the channel impulse response and $L_{hc}$ is the length of the causal part of the channel impulse response. A vector b of length $L_b$ is defined as the reliable trellis decoder decisions on the input symbols that are provided by the long traceback trellis decoder 14. Also, a Toeplitz matrix B is then defined according to the following equation:

$$B = \begin{bmatrix} b_{L_h-1} & b_{L_h-2} & — & — & b_0 \\ — & b_{L_h-1} & — & — & — \\ — & — & — & — & — \\ — & — & — & — & b_{L_h-1} \\ — & — & — & — & — \\ — & — & — & b_{L_b-L_h} & — \\ b_{L_b-1} & b_{L_b-2} & — & — & b_{L_b-L_h} \end{bmatrix} \quad (9)$$

where the elements are real and consist of the symbol decisions in the vector b. To ensure an over determined system of equations, $L_b$ is given by the following inequality:

$$L_b \geq 2L_h - 1 \quad (10)$$

The Toeplitz matrix B is of dimension $(L_b - L_h + 1) \times L_h$ with $(L_b - L_h + 1) \geq L_h$.

The received signal vector y has elements $y_i$ for $L_{hc} \leq i \leq (L_b - L_{ha} - 1)$ where $y_i$ is the received symbol corresponding to the symbol decision $b_i$. The received signal vector y is given by the following equation:

$$y = Bh + v \quad (11)$$

where h is the $L_h$ long channel impulse response vector and v is a noise vector. The least squares solution for h is given by the following equation:

$$\hat{h}_{LS} = (B^T B)^{-1} B^T y \quad (12)$$

By utilizing reliable trellis decoder input symbol decisions, there is sufficient support for calculating a channel impulse response estimate with the required delay spread. As required by inequality (10), the vector b of symbol decisions must be at least twice as long as the channel impulse response being estimated. The system of equations is sufficiently over determined in order to diminish the adverse effect of additive White Gaussian Noise (AWGN). Therefore, a vector b of symbol decisions that is longer than twice the channel impulse response length is preferred.

The tap weight calculations performed by the tap weight calculator 20 and the tap weight calculator 34 require not only a channel impulse response estimate but also a noise estimate. The noise may be estimated by calculating an estimate of the received vector y according to $\hat{y} = A\hat{h}$ where $\hat{h}$ is the latest calculated channel impulse response estimate. Then, the noise estimation is given by the following equation:

$$\hat{\sigma}^2 = \frac{\|\hat{y} - y\|^2}{\text{length}(y)} \quad (13)$$

where $\|.\|$ is the 2-norm.

In order to apply the above equations to an 8 VSB receiver, the following parameters may be used as an example: $L_h = 512$, $L_{ha} = 63$, $L_{hc} = 448$, $L_b = 2496$, and $L_n = 704$. The vector b is formed from a sequence of trellis decoder decisions made by the long traceback trellis decoder 14 on the input symbols. The delay ($31 \times 12 = 372$) of the long traceback trellis decoder 14 is not significant compared to a channel impulse response estimate update rate of once per segment. Normally, the long traceback trellis decoder 14 would just make output bit pair decisions, but it can also make equally reliable decisions on the input symbols.

The vector b, for example, may be selected as three segments ($L_b = 2496$ symbols) long. So, three data segments may be used to produce a single channel impulse response estimate update. A new channel impulse response update can be obtained once per segment by proceeding in a sliding window manner. Optionally, several consecutive channel impulse response estimate updates can be averaged in order to further improve channel impulse response accuracy if necessary. This additional averaging can be a problem if the channel impulse response is varying rapidly.

A vector b with fewer than three segments of symbol decisions may be used provided that, as stated in inequality (10), the length of the vector b is at least twice as long as the channel impulse response to be estimated. As previously stated, however, long b vectors help to diminish the adverse effects of AWGN.

The latency time (which may be referred to as Tap Update Latency or TUL) involved in updating the decision feedback equalizer 22 with new tap weights is caused by the sum of (i) the symbol decision delay of the long traceback trellis decoder 14, (ii) the time delay resulting from the calculation by the least squares channel impulse and noise update estimator 32 of the channel impulse response estimate update, and (iii) the time delay resulting from the calculation by the tap weight calculator 34 of the MMSE tap weights.

The delay of the first item (i) may be reduced if, instead of using only decisions of the long traceback trellis decoder 14 for the channel impulse response estimate update, a combination of symbol decisions from the long traceback trellis decoder 14 and the short traceback trellis decoder 12 is used. The use of this combination of symbol decisions is illustrated in FIGS. 4 and 5.

Figure 4:
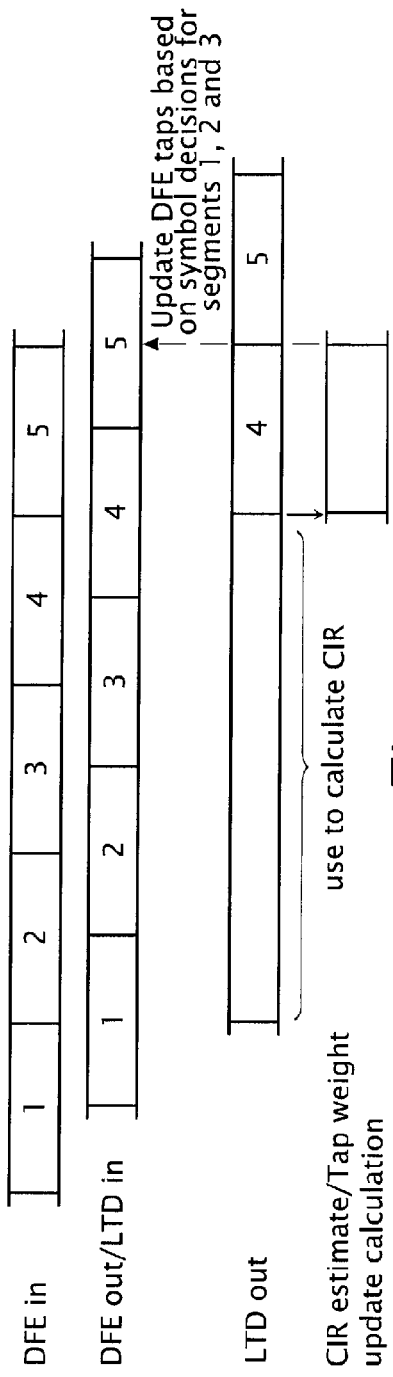
FIG. 4 is a timing diagram illustrating the non-zero time period required for the calculation of a channel impulse estimate and updated tap weights.
Figure 5:
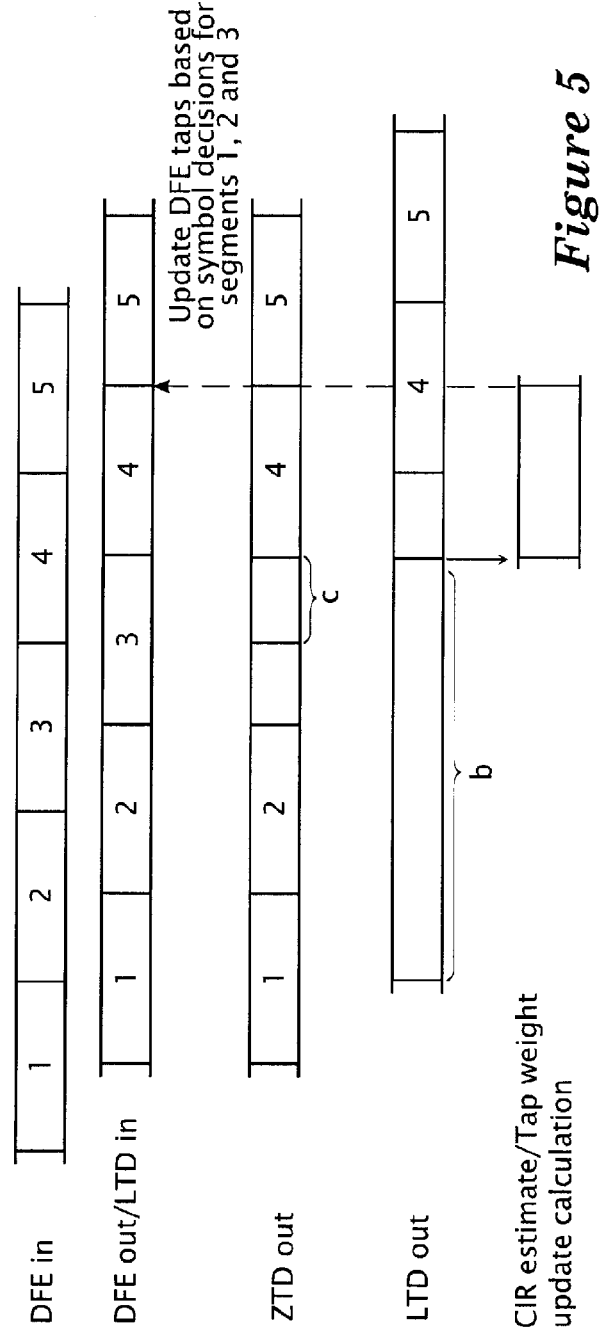
FIG. 5 is a timing diagram useful in illustrating a first improvement relative to the performance of a decision feedback equalizer in the presence of time varying channel impulse responses.

The first row of the timing diagram in FIG. 4 represents a series of segment time periods containing corresponding segments of received symbols y as they are input to the decision feedback equalizer 22.

The second row represents the delay that the processing of the decision feedback equalizer 22 imposes on these segment time periods as the corresponding equalized segments exit from the output of the decision feedback equalizer 22 and are provided to the long traceback trellis decoder 14. As shown in FIG. 4, the processing of the decision feedback equalizer 22 delays the segments in time relative to the corresponding segments at the input of the decision feedback equalizer 22.

The third row represents the additional delay that the processing of the long traceback trellis decoder 14 imposes on these segment time periods as the corresponding segments of symbol decisions exit from the output of the long traceback trellis decoder 14 and are provided to the least squares channel impulse and noise update estimator 32. As shown in FIG. 4, the processing of the long traceback trellis decoder 14 delays the symbol decisions in time relative to the corresponding equalized segments (second row) at the input of the long traceback trellis decoder 14.

The fourth row represents the additional delays of making the channel impulse response and tap weight calculations by the least squares channel impulse and noise update estimator 32 and the tap weight calculator 34. For the sake of convenience (and not of necessity), it may be assumed that each of the delays given in items (i), (ii), and (iii) above is, for example, a ½ segment delay. With these assumptions, the updated tap weights calculated by the tap weight calculator 34 from the vector b that is composed of the symbol decisions in the three segment time periods 1, 2, and 3 will not be applied to the decision feedback equalizer 22 until after the second half of the equalized segment in segment time period 5 begins being output from the decision feedback equalizer 22. This corresponds to a 1.5 segment update delay. Accordingly, the tap update latency TUL is 1.5 segments.

In a channel whose channel impulse response is rapidly changing, this delay between (i) the time that segments are processed by the decision feedback equalizer 22 and (ii) the time at which the updated tap weights calculated on the basis on these segments are applied to the decision feedback equalizer 22 may degrade performance of the decision feedback equalizer 22 because the channel impulse response changes too much between the end of segment 3 and the beginning of segment 5.

Several delay assumptions are made above for the purpose of a clear explanation. However, these assumptions are assumptions only and are not intended to be limiting.

The timing diagram of FIG. 5 shows an improvement in the determination of the tap weights to be supplied to the decision feedback equalizer 22. Here, 2.5 segments of symbol decisions b from the long traceback trellis decoder 14 plus 0.5 segments of symbol decisions c from the short traceback trellis decoder 12 are used by the least squares channel impulse and noise update estimator 32 to form a three segment long decision vector b that it then uses to produce the updated channel impulse estimate $\hat{h}_{LS}$.

Again, it should be stressed that these relative amounts of the symbol decisions b and c are based on the assumed delays and, if the delays are in reality different, the relative amounts of the symbol decisions b and c will accordingly be different. Thus, the size of the portion of the three segment long decision vector c that is contributed by the short traceback trellis decoder 12 is chosen to be equal to the delay imposed by the processing of the long traceback trellis decoder 14. As an example, given the assumptions discussed above, this delay is 0.5 segment. Accordingly, the use of the symbol decisions c removes the delay imposed by the processing of the long traceback trellis decoder 14 from the tap update latency TUL, thereby reducing it to one segment.

Accordingly, the first row of the timing diagram in FIG. 5 represents a series of segment time periods containing corresponding segments of received symbols y as they are input to the decision feedback equalizer 22.

The second row represents the delay that the processing of the decision feedback equalizer 22 imposes on these segment time periods as the corresponding equalized segments exit from the output of the decision feedback equalizer 22 and are provided to the long traceback trellis decoder 14. As shown in FIG. 5, the processing of the decision feedback equalizer 22 delays the segments in time relative to the corresponding segments at the input of the decision feedback equalizer 22.

The third row represents the zero delay that the processing of the short traceback trellis decoder 12 imposes on these segment time periods as the corresponding segments of symbol decisions exit from the output of the short traceback trellis decoder 12 and are provided to the least squares channel impulse and noise update estimator 32.

The fourth row represents the additional delay that the processing of the long traceback trellis decoder 14 imposes on these segment time periods as the corresponding segments of symbol decisions exit from the output of the long traceback trellis decoder 14 and are provided to the least squares channel impulse and noise update estimator 32. As shown in FIG. 5, the processing of the long traceback trellis decoder 14 delays the symbol decisions in time relative to the corresponding equalized segments at the input of the long traceback trellis decoder 14.

The fifth row represents the additional delays of making the channel impulse response and tap weight calculations by the least squares channel impulse and noise update estimator 32 and the tap weight calculator 34.

As shown in FIG. 5, the least squares channel impulse and noise update estimator 32 uses 2.5 segments of symbol decisions b from the long traceback trellis decoder 14 and 0.5 segments of symbol decisions c from the short traceback trellis decoder 12 in the calculation of the updated channel impulse estimate $\hat{h}_{LS}$. Given the assumption that the delay imposed by the long traceback trellis decoder 14 is 0.5 segment, then the 0.5 segments of symbol decisions c contributed by the short traceback trellis decoder 12 occur contemporaneously with the last half segment of the 2.5 segments of symbol decisions b contributed by the long traceback trellis decoder 14.

The symbol decisions c of the short traceback trellis decoder 12 are somewhat less reliable than the symbol decisions b of the long traceback trellis decoder 14. However, when the channel impulse response is changing rapidly, as is the case with mobile receivers, the reduced the tap update latency TUL is a worthwhile tradeoff against the less accurate symbol decisions c.

The long traceback trellis decoder 14 has the capability of outputting a reliable decision after a delay $D_{max}$ equal to its maximum traceback depth minus 1. It is well known that the path memories internal to a long traceback trellis decoder simultaneously hold symbol decisions of delay zero up to delay $D_{max}$, with the most reliable decisions having a delay $D_{max}$ and with the decisions gradually becoming less reliable as the delay approaches zero. These symbol decisions can be output in parallel at any desired time from zero delay to $D_{max}$ as shown by US published patent application US2002/0154248 A1. This published application describes the use of such parallel outputs to feed decisions back into the feedback filter of a decision feedback equalizer. This operation is effectively parallel loading where, for each symbol update, a new set of decisions with delays of zero up to delay $D_{max}$ are simultaneously loaded into the feedback filter.

Figure 6:
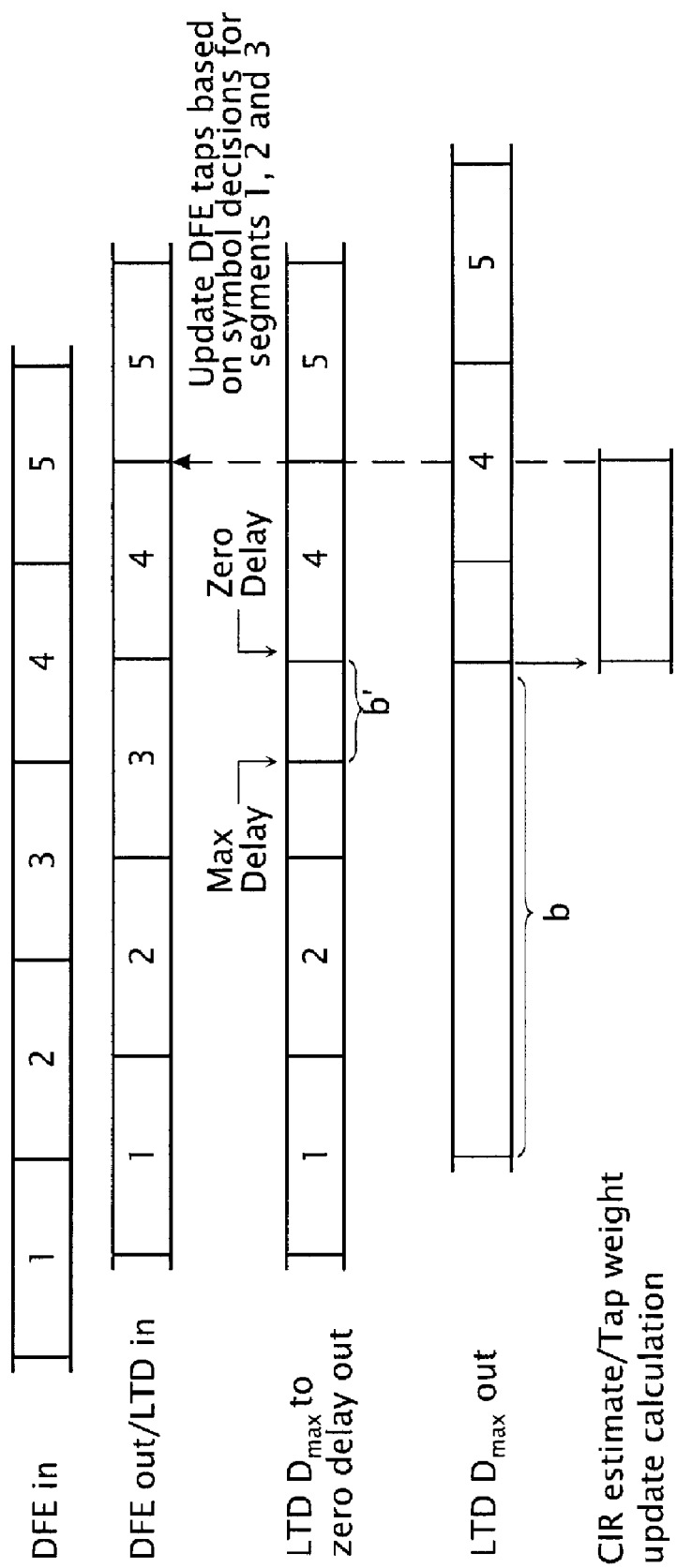
FIG. 6 is a timing diagram useful in illustrating a second improvement relative to the performance of a decision feedback equalizer in the presence of time varying channel impulse responses; and, FIG. 7 illustrates a tracking decision feedback equalizer system that implements a third improvement relative to the performance of a decision feedback equalizer in the presence of time varying channel impulse responses.

This concept may be applied by the least squares channel impulse and noise update estimator 32 in determining the updated channel impulse estimate $\hat{h}_{LS}$. Instead of using a combination of symbol decisions from long traceback trellis decoder 14 and the short traceback trellis decoder 12 as described in relation to FIG. 5, a sufficient number of the parallel survivor path memory outputs of the long traceback trellis decoder 14 is used as shown in FIG. 6 for the last 0.5 segment of symbol decisions b' needed for the channel impulse response estimate update, assuming a 0.5 segment delay. This method provides the desired reduction in tap update latency TUL and, at the same time, uses more reliable symbol decisions compared to using a combination of symbol decisions from the long traceback trellis decoder 14 and the short traceback trellis decoder 12 as described in relation to FIG. 5.

Accordingly, the first row of the timing diagram in FIG. 6 represents a series of segment time periods containing corresponding segments of received symbols y as they are input to the decision feedback equalizer 22.

The second row represents the delay that the processing of the decision feedback equalizer 22 imposes on these segment time periods as the corresponding equalized segments exit from the output of the decision feedback equalizer 22 and are provided to the long traceback trellis decoder 14. As shown in FIG. 6, the processing of the decision feedback equalizer 22 delays the segments in time relative to the corresponding segments at the input of the decision feedback equalizer 22.

The third row represents the zero to $D_{max}$ delay that the processing of the long traceback trellis decoder 14 imposes on these segment time periods as the corresponding segments of symbol decisions are output in parallel from the long traceback trellis decoder 14 and are provided to the least squares channel impulse and noise update estimator 32.

The fourth row represents the $D_{max}$ delay that the processing of the long traceback trellis decoder 14 imposes on these segment time periods as the corresponding segments of symbol decisions exit from the output of the long traceback trellis decoder 14 and are provided to the least squares channel impulse and noise update estimator 32. As shown in FIG. 6, the processing of the long traceback trellis decoder 14 delays the symbol decisions in time relative to the corresponding equalized segments at the input of the long traceback trellis decoder 14.

The fifth row represents the additional delays of making the channel impulse response and tap weight calculations by the least squares channel impulse and noise update estimator 32 and the tap weight calculator 34.

As shown in FIG. 6, the least squares channel impulse and noise update estimator 32 uses 2.5 segments of symbol decisions b from the output of the long traceback trellis decoder 14 and 0.5 segments of parallel symbol decisions b' from the long traceback trellis decoder 14 in the calculation of the updated channel impulse estimate $\hat{h}_{LS}$. Given the assumption that the delay imposed by the long traceback trellis decoder 14 is 0.5 segment, then the 0.5 segment of parallel symbol decisions contributed by the long traceback trellis decoder 14 occur contemporaneously with the last half segment of the 2.5 segments of symbol decisions contributed by the output of the long traceback trellis decoder 14.

The parallel symbol decisions from the long traceback trellis decoder 14 (see b' in FIG. 3) are more reliable than the symbol decisions of the short traceback trellis decoder 12.

Figure 7:
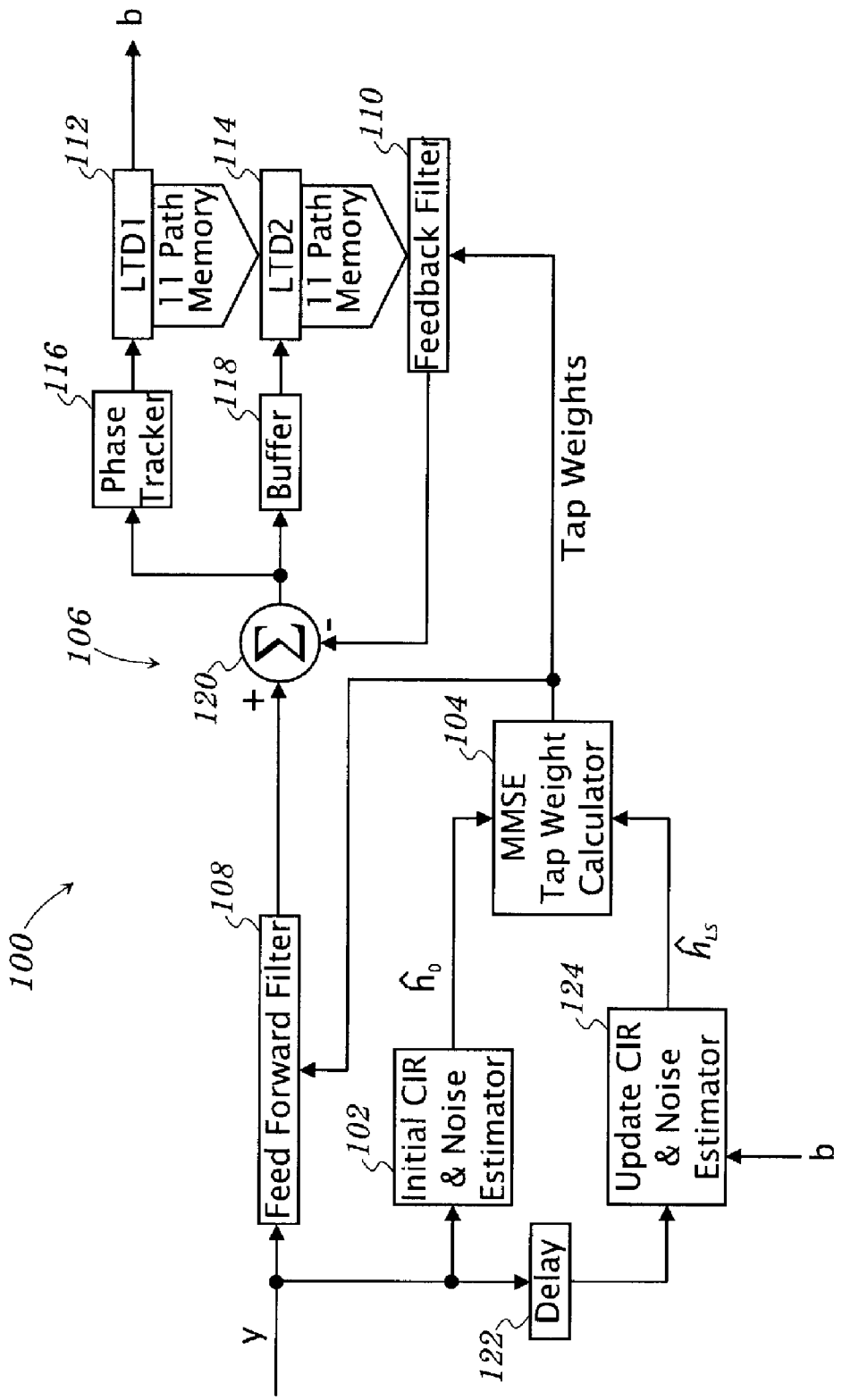

FIG. 7 illustrates a decision feedback equalizer system 100 according to an example embodiment of the present invention. For convenience, the automatic gain controller 16 has been omitted from FIG. 7. However, it should be understood that the automatic gain controller 16 may be part of the decision feedback equalizer system 100, as desired.

Initial tap weights are calculated as described above. Accordingly, an initial channel impulse response and noise estimator 102 uses a training sequence to provide an initial estimate $\hat{h}_0$ of the channel impulse response. A tap weight calculator 104 calculates an initial set of tap weights based on the initial estimate $\hat{h}_0$ of the channel impulse response using, for example, a MMSE based algorithm, and supplies this initial set of tap weights to a decision feedback equalizer 106 comprising a feed forward filter 108 and a feedback filter 110. At all other times, and as discussed below, symbol decisions b are used to calculate the tap weights which are then applied to the feed forward filter 108 and the feedback filter 110 of the decision feedback equalizer 106.

The decision feedback equalizer system 100 makes use of two 12-phase trellis decoders 112 and 114, a phase tracker 116, and a buffer 118. Each of the 12-phase trellis decoders 112 and 114 has a long traceback depth. A combiner 120 subtracts the output of the feedback filter 110 from the output of the feed forward filter 108 to provide an equalized output to the phase tracker 116 and to the buffer 118. The 12-phase trellis decoder 112 provides the final symbol decisions b for the subsequent stages of the receiver in which the decision feedback equalizer system 100 is used.

The signal y to be equalized is delayed by a delay 122, and the delayed signal y and the symbol decisions b from the long traceback delay 12-phase trellis decoder 112 are processed by a channel impulse and noise update estimator 124 that produces an updated channel impulse estimate $\hat{h}_{LS}$. The tap weight calculator 104 uses the updated channel impulse estimate $\hat{h}_{LS}$ to calculate an updated set of tap weights for the decision feedback equalizer 106. As before, the tap weights determined by the tap weight calculator 104 based on the symbol decisions b are provided to the decision feedback equalizer 106 during periods when the tap weights based on the training sequence are not available. The delay imposed by the delay 122 is equal to the delay of the decision feedback equalizer 106 plus the delay of the long traceback 12-phase trellis decoder 112.

The phase tracker 116 provides its output to the 12-phase trellis decoder 112. Phase trackers, such as the phase tracker 116, are discussed in detail in U.S. Pat. No. 5,406,587 and also the ATSC standards document A/154. They are effective in reducing the carrier phase noise remaining after down converting a received signal to baseband. Thus, a trellis decoder fed by a phase tracker will produce a more reliable output than if the phase tracker were not present. However, a phase tracker causes an additional processing delay d that must be considered. In particular, the delay d will affect the ability of the decision feedback equalizer 106 to cancel short delay multipath. This problem is alleviated by use of the buffer 118 and the 12-phase second trellis decoder 114 as described below.

The buffer 118 provides its output to the 12-phase trellis decoder 114. The buffer 118 holds the d most recent symbols from the output of the combiner 120.

Because the 12-phase trellis decoder 112 is supplied with data from the phase tracker 116, the output of the 12-phase trellis decoder 112 is delayed by an additional d symbol periods. However, the output of the 12-phase trellis decoder 112 is more reliable due to the action of the phase tracker 116. The parallel path memory output of the 12-phase trellis decoder 112 is fed to the 12-phase trellis decoder 114 and is used to completely overwrite the path memory of the 12-phase trellis decoder 114. The parallel output of the 12-phase trellis decoder 114, which includes symbol decisions in a range of delays from $D_{max}$ to zero, is fed to the feedback filter 110 and is used to completely overwrite the symbol decisions stored at the beginning of the feedback filter 110 commensurate with the number of parallel symbol decisions from the 12-phase trellis decoder 114.

During the processing of each symbol that is received by the decision feedback equalizer system 100 (that is, during each symbol time), the decision feedback equalizer system 100 performs all of the following functions: 1) the latest output symbol from the combiner 120 is fed into the phase tracker 116 and into the buffer 118, 2) the data in the feedback filter 110 is shifted one symbol position (to the left as shown in FIG. 7), 3) a phase corrected delayed-by-d symbol from the output of the phase tracker 116 is applied to the 12-phase trellis decoder 112, 4) in response to this delayed-by-d symbol from the output of the phase tracker 116, the 12-phase trellis decoder 112 applies its Viterbi algorithm in order to update its symbol decision path memory of length $D_{max}$ and applies its updated symbol decision path memory of length $D_{max}$ in parallel to the 12-phase trellis decoder 114, 5) the 12-phase trellis decoder 114 overwrites its own path memory with the updated symbol decision path memory from the 12-phase trellis decoder 112, 6) in response to the latest symbol output from the combiner 120, the buffer 118 discards its oldest symbol so that it holds only the most recent d symbols, 7) these d most recent symbols in the buffer 118 are fed one at a time into the 12-phase trellis decoder 114, 8) as each of these d symbols is received by the 12-phase trellis decoder 114, the 12-phase trellis decoder 114 applies its Viterbi algorithm in order to update its symbol decision path memory of length $D_{max}$, and 9) after all of these d symbols have been processed by the 12-phase trellis decoder 114, the path memory of the 12-phase trellis decoder 114 is applied in parallel to the newest filter positions of the feedback filter 110.

Accordingly, the 12-phase trellis decoder 114 has the benefit of ($D_{max}$–d) improved symbol decisions from the 12-phase trellis decoder 112 when the 12-phase trellis decoder 114 outputs its decisions to the feedback filter 110.

Certain modifications of the present invention have been discussed above. Other modifications of the present invention will occur to those practicing in the art of the present invention. For example, the decoders 112 and 114 are described above as 12-phase trellis decoders. The use of 12-phase trellis decoders is, for the most part, specific to the digital television application in compliance with the ATSC standard. For other applications, however, decoders other than 12-phase trellis decoders may be used.

As another example, the tap weight calculator 104 as described above calculates tap weights using, for example, a MMSE based algorithm. However, other methodologies may be used to calculate tap weights.

As yet another example, circuits other than phase trackers can be used in the present invention to provide correction of the received signal, of the equalized signal, and/or of the decoded signal. Any delay that results from the use of such other circuits can be mitigated by the buffer 118 applying an appropriate delay.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of operating a decision feedback equalizer comprising:

correcting an output of the decision feedback equalizer to produce a corrected output characterized by a delay d;

making first symbol decisions based on the corrected output, wherein the first symbol decisions are made by a first long traceback decoder having a parallel path memory output;

storing an amount of the output of the decision feedback equalizer commensurate with the delay d, wherein the stored output comprises the most recent output of the decision feedback equalizer;

making second symbol decisions based on the stored output and the parallel path memory output from the first long traceback decoder, wherein the second symbol decisions are made by a second long traceback decoder having a parallel path memory output;

applying the parallel path memory output of the second long traceback decoder to the decision feedback equalizer; and, determining tap weights for the decision feedback equalizer based on the symbol decisions made by the first long traceback decoder.

2. The method of claim 1 wherein the stored output comprises d stored symbols, wherein the making of first symbol decisions comprises making each of the first symbol decisions during a corresponding symbol interval, and wherein the making of second symbol decisions comprises, during each of the symbol intervals, a) applying the parallel path memory output of the first long traceback decoder to the second long traceback decoder, and b) then feeding each of the d stored symbols to the second long traceback decoder one at a time.

3. The method of claim 2 wherein the applying of the parallel path memory output of the second long traceback decoder to the decision feedback equalizer comprises applying the parallel path memory output of the second long traceback decoder to the decision feedback equalizer only after the second long traceback decoder has processed each of the d stored symbols fed to it during a corresponding symbol interval, and wherein the applying of the parallel path memory output of the second long traceback decoder to the decision feedback equalizer is performed only once in each of the symbol intervals.

4. The method of claim 1 wherein the correcting of an output of the decision feedback equalizer comprises applying phase tracking to the output of the decision feedback equalizer.

5. The method of claim 1 wherein the determining of tap weights for the decision feedback equalizer comprises determining updated tap weights for the decision feedback equalizer, and wherein the method further comprises determining training tap weights for the decision feedback equalizer based on a received training sequence.

6. The method of claim 5 wherein the correcting of an output of the decision feedback equalizer comprises applying phase tracking to the output of the decision feedback equalizer.

7. The method of claim 1 wherein the decision feedback equalizer comprises a feed forward filter, a feedback filter, and a combiner that combines outputs from the feed forward filter and the feedback filter to produce the output of the decision feedback equalizer, wherein the applying of the parallel path memory output of the second long traceback decoder to the decision feedback equalizer comprises applying the parallel path memory output of the second long traceback decoder to the feedback filter, and wherein the determining of tap weights for the decision feedback equalizer comprises determining tap weights for the feed forward filter and the feedback filter based on the symbol decisions made by the first long traceback decoder.

8. The method of claim 7 wherein the stored output comprises d stored symbols, wherein the making of first symbol decisions comprises making each of the first symbol decisions during a corresponding symbol interval, and wherein the making of second symbol decisions comprises, during each of the symbol intervals, a) applying the parallel path memory output of the first long traceback decoder to the second long traceback decoder, and b) then feeding each of the d stored symbols to the second long traceback decoder one at a time.

9. The method of claim 8 wherein the applying of the parallel path memory output of the second long traceback decoder to the decision feedback equalizer comprises applying the parallel path memory output of the second long traceback decoder to the feedback filter only after the second long traceback decoder has processed each of the d stored symbols fed to it during a corresponding symbol interval, and wherein the applying of the parallel path memory output of the second long traceback decoder to the feedback filter is performed only once in each of the symbol intervals.

10. The method of claim 7 wherein the correcting of an output of the decision feedback equalizer comprises applying phase tracking to the output of the decision feedback equalizer.

11. The method of claim 7 wherein the determining of tap weights for the decision feedback equalizer comprises determining updated tap weights for the feed forward filter and the feedback filter, and wherein the method further comprises determining training tap weights for the feed forward filter and the feedback filter based on a received training sequence.

12. The method of claim 11 wherein the correcting of an output of the decision feedback equalizer comprises applying phase tracking to the output of the decision feedback equalizer.

13. An equalizer system comprising:
a feed forward filter, wherein the feed forward filter receives data to be equalized;
a feedback filter;
a combiner, wherein the combiner combines outputs from the feed forward filter and the feedback filter to provide an equalizer output;
a signal corrector, wherein the signal corrector corrects the equalizer output to provide a corrected output characterized by a delay d;
a first decoder characterized by a first parallel output, wherein the first decoder decodes the corrected output to provide a first decoded output;
a memory, wherein the memory stores an amount of the equalizer output commensurate with the delay d, and wherein the stored equalizer output comprises the most recent equalizer output;
a second decoder characterized by a second parallel output, wherein the second decoder receives the first parallel output and the stored equalizer output and decodes the stored equalizer output to provide a second parallel output, and wherein the second decoder applies the second parallel output to the feedback filter; and,
a tap weight controller, wherein the tap weight controller determines tap weights based on the first decoded output and supplies the tap weights to the feed forward filter and to the feedback filter.

14. The equalizer system of claim 13 wherein the equalizer output comprises equalizer output symbols, wherein the stored equalizer output comprises d stored symbols, wherein the first decoder decodes each of the equalizer output symbols during a corresponding symbol interval, and wherein the second decoder, during each of the symbol intervals, a) receives the first parallel output, and b) then decodes each of the d stored symbols one at a time.

15. The equalizer system of claim 14 wherein the second decoder applies the second parallel output to the feedback filter only after the second decoder has decoded each of the d stored symbols during the corresponding symbol interval.

16. The equalizer system of claim 13 wherein the signal corrector comprises a phase tracker.

17. The equalizer system of claim 13 wherein the tap weight controller comprises an update tap weight controller that determines updated tap weights for the feed forward filter and the feedback filter, wherein the equalizer system further comprises a training tap weight controller, and wherein the training tap weight controller determines training tap weights for the feed forward filter and the feedback filter based on a received training sequence.

18. The equalizer system of claim 17 wherein the signal corrector comprises a phase tracker.

19. An equalizer system comprising:
an equalizer arranged to provide an equalizer output;
a signal corrector, wherein the signal corrector corrects the equalizer output to provide a corrected output characterized by a delay d;
a first decoder characterized by a first parallel output, wherein the first decoder decodes the corrected output to provide a first decoded output;
a memory, wherein the memory stores an amount of the equalizer output commensurate with the delay d, and wherein the stored equalizer output comprises the most recent equalizer output;
a second decoder characterized by a second parallel output, wherein the second decoder receives the first parallel output and the stored equalizer output and decodes the stored equalizer output to provide a second parallel output, and wherein the second decoder applies the second parallel output to the equalizer; and,
a tap weight controller, wherein the tap weight controller determines tap weights based on the first decoded output and supplies the tap weights to the equalizer.

20. The equalizer system of claim 19 wherein the equalizer output comprises equalizer output symbols, wherein the stored equalizer output comprises d stored symbols, wherein the first decoder decodes each of the equalizer output symbols during a corresponding symbol interval, and wherein the second decoder, during each of the symbol intervals, a) receives the first parallel output, and b) then decodes each of the d stored symbols one at a time.

21. The equalizer system of claim 20 wherein the second decoder applies the second parallel output to the equalizer only after the second decoder has decoded each of the d stored symbols during the corresponding symbol interval.

* * * * *